US012717784B2

(12) United States Patent
Au et al.

(10) Patent No.: US 12,717,784 B2
(45) Date of Patent: Aug. 25, 2026

(54) QUERY EXPRESSION REPOSITORY

(71) Applicant: Teradata US, Inc., San Diego, CA (US)

(72) Inventors: Grace Kwan-On Au, Rancho Palos Verdes, CA (US); Nobul Reddy Goli, Hyderabad (IN); Vivek Kumar, Jharkhand (IN); Ming Zhang, Rolling Hills Estates, CA (US); Bin Cao, Redondo Beach, CA (US); Sanjay Nair, El Segundo, CA (US); Kanaka Durga Rajanala, El Segundo, CA (US); Sanjib Mishra, Hyderabad (IN); Naveen Jaiswal, Hyderabad (IN); Lu Ma, Tenafly, NJ (US); Xiaorong Luo, Bellevue, WA (US)

(73) Assignee: Teradata US, Inc., San Diego, CA (US)

(*) Notice: Subject to any disclaimer, the term of this patent is extended or adjusted under 35 U.S.C. 154(b) by 200 days.

(21) Appl. No.: 16/728,387

(22) Filed: Dec. 27, 2019

(65) Prior Publication Data

US 2021/0056106 A1 Feb. 25, 2021

Related U.S. Application Data

(60) Provisional application No. 62/888,761, filed on Aug. 19, 2019.

(51) Int. Cl.

*G06F 16/2453* (2019.01)
*G06F 16/22* (2019.01)
*G06F 16/242* (2019.01)
*G06N 20/00* (2019.01)

(52) U.S. Cl.

CPC .... *G06F 16/24542* (2019.01); *G06F 16/2246* (2019.01); *G06F 16/2425* (2019.01); *G06N 20/00* (2019.01)

(58) Field of Classification Search

None

See application file for complete search history.

(56) References Cited

U.S. PATENT DOCUMENTS 7,984,043 B1 * 7/2011 Waas .................. G06F 16/8358 707/718
9,183,254 B1 * 11/2015 Cole .................. G06F 16/2453
9,501,536 B1 * 11/2016 El-Helw ........... G06F 16/24542
10,025,819 B2 * 7/2018 Chang .............. G06F 16/24522
(Continued)

*Primary Examiner* — Giuseppi Giuliani
(74) *Attorney, Agent, or Firm* — James Stover

(57) ABSTRACT

An apparatus, method and computer program product for query optimization in a Relational Database Management System (RDBMS), wherein an optimizer accesses a query expression repository (QER), so that the optimizer learns from previous versions of the queries to improve current and subsequent versions of the queries. The QER stores planning and execution information for QEs from the previous versions of the queries, wherein the QEs comprise table relations, intermediate results and/or final results of operations in the previous versions of the queries. The optimizer searches the QER for QEs from the query execution plans, and uses information from the QEs stored in the QER when optimizing the current and subsequent versions of the queries. The optimizer may also reuses results from the QEs stored in the QER.

17 Claims, 8 Drawing Sheets

(56) References Cited

U.S. PATENT DOCUMENTS

| | | | | |
|---|---|---|---|---|
| 2005/0283458 | A1* | 12/2005 | Galindo-Legaria | G06F 16/22 |
| 2007/0250473 | A1* | 10/2007 | Larson | G06F 16/24539 |
| 2017/0083573 | A1* | 3/2017 | Rogers | G06F 16/2455 |
| 2017/0147621 | A1* | 5/2017 | De Smet | G06F 16/2246 |
| 2018/0329955 | A1* | 11/2018 | Chaudhuri | G06F 16/24545 |
| 2019/0129811 | A1* | 5/2019 | Zhu | G06F 11/1469 |
| 2020/0117762 | A1* | 4/2020 | Haprian | G06F 16/9024 |
| 2020/0142990 | A1* | 5/2020 | Freedman | G06F 16/24547 |
| 2020/0409948 | A1* | 12/2020 | Corvinelli | G06N 3/0472 |
| 2022/0004551 | A1* | 1/2022 | Ghazal | G06F 7/16 |
| 2022/0019586 | A1* | 1/2022 | Wang | G06F 16/24542 |
| 2022/0050843 | A1* | 2/2022 | Hu | G06F 16/24524 |

* cited by examiner

QER 402

| QE ID | QE OP | SOURCE 1 | SOURCE 2 | FREQUENCY | PROJECTION | CONDITION |
| --- | --- | --- | --- | --- | --- | --- |
| QE 1 | SINGLE TABLE | STORE_SALES | 0 | 1 | SS_CUSTOMER_KEY, SS_LIST_PRICE, SS_DISCOUNT_AMT, SS_SOLD_DATE_SK, | TRUE |
| QE 2 | SINGLE TABLE | DATE_DIM | 0 | 1 | D_DATE_SK, D_YEAR | D_YEAR >= 2001 AND D_YEAR <= 2002 |
| QE 3 | INNER JOIN | QE1 | QE2 | 1 | SS_LIST_PRICE, SS_DISCOUNT_AMT, D_YEAR | SS_SOLD_DATE_SK = D_YEAR |

*FIG. 5*

QER 402

| QE ID | QE OP | SOURCE 1 | SOURCE 2 | FREQUENCY | PROJECTION | CONDITION |
|---|---|---|---|---|---|---|
| QE1 | SINGLE TABLE | STORE_SALES | 0 | 2 | SS_CUSTOMER_KEY, SS_LIST_PRICE, SS_DISCOUNT_AMT, SS_SOLD_DATE_SK, | TRUE |
| QE2 | SINGLE TABLE | DATE_DIM | 0 | 2 | D_DATE_SK, D_YEAR | D_YEAR >= 2001 AND D_YEAR <= 2002 |
| QE3 | INNER JOIN | QE1 | QE2 | 2 | SS_LIST_PRICE, SS_DISCOUNT_AMT, D_YEAR | SS_SOLD_DATE_SK = D_YEAR |
| QE4 | SINGLE TABLE SELECT | CUSTOMER | 0 | 1 | C_CUSTOMER_SK, C_CUSTOMER_ID, C_FIRST_NAME, C_LAST_NAME, C_BIRTH_COUNTRY, C_EMAIL_ADDRESS | TRUE |
| QE5 | INNER JOIN | QE3 | QE4 | 1 | C_CUSTOMER_ID, C_FIRST_NAME, C_LAST_NAME, C_BIRTH_COUNTRY, C_EMAIL_ADDRESS. | SS_CUSTOMER_KEY = C_CUSTOMER_KEY |

FIG. 7

QUERY EXPRESSION REPOSITORY

CROSS REFERENCE TO RELATED APPLICATIONS

This application is related to the following co-pending and commonly-assigned application:

U.S. Provisional Patent Application Ser. No. 62/888,761, filed on Aug. 19, 2019, by Grace Kwan-On Au, Nobul Reddy Goli, Vivek Kumar, Ming Zhang, Bin Cao, Sanjay Nair, Kanaka Durga Rajanala, Sanjib Mishra, Naveen Jaiswal, Lu Ma and Xiaorong Luo, and entitled "QUERY EXPRESSION REPOSITORY,";

which application is incorporated by reference herein.

BACKGROUND OF THE INVENTION

1. Field of the Invention

This invention relates to methods and techniques for query optimization in relational database management systems.

2. Description of Related Art

Computer systems implementing a Relational DataBase Management System (RDBMS) using Structured Query Language (SQL) statements are well known in the art. In a relational database, data is stored into tables, wherein the tables are at least two dimensional, consisting of rows and columns. SQL statements may be formulated as queries, among other operations, to select rows of the tables by specifying one or more query expressions (QEs) that perform logical operations on the data in one or more of the columns.

A number of optimization techniques have been developed for minimizing the time required to perform these logical operations. However, there is still a need in the art for additional optimization techniques. The present invention satisfies this need.

SUMMARY OF THE INVENTION

One or more embodiments of the invention provides an apparatus, method and computer program product for query optimization in an RDBMS, wherein an optimizer accesses a query expression repository (QER), so that the optimizer learns from previous versions of the queries to improve current and subsequent versions of the queries.

The QER stores planning and execution information for QEs from the previous versions of the queries, wherein the QEs comprise table relations, intermediate results and/or final results of operations. The optimizer searches the QER for QEs, and uses information from the QEs stored in the QER when optimizing the current and subsequent versions of the queries. The optimizer may also reuse results from the QEs stored in the QER.

The QEs are stored in the QER with a QE identifier; an operation performed; one or more source identifiers associated with the operation; and operation-specific information such as frequency of use, projections and conditions. The optimizer searches the QER for the QEs based on the operation, source identifiers, projections and conditions. The QEs may be stored in the QER in an order that the optimizer plans the operations, namely, a bottom-up order represented by QE trees.

The QER is managed by a QER manager that uniquely identifies each of the QEs in the QER and increments a frequency for each of the QEs based on how often each of the QEs is referenced in previous, current and subsequent versions of the queries.

BRIEF DESCRIPTION OF THE DRAWINGS

Referring now to the drawings in which like reference numbers represent corresponding parts throughout:

FIG. 5 is a table illustrating query expressions logged in a query expression repository.

FIG. 7 is a table illustrating additional query expressions logged in the query expression repository.

DETAILED DESCRIPTION OF THE PREFERRED EMBODIMENT

In the following description of the preferred embodiment, reference is made to the accompanying drawings, which form a part hereof, and in which is shown by way of illustration a specific embodiment in which the invention may be practiced. It is to be understood that other embodiments may be utilized and structural changes may be made without departing from the scope of the present invention.

Overview

This invention proposes an approach of supplementing an optimizer for an RDBMS with a light-weight QER, so that the optimizer can learn from the planning and execution of previous queries to improve the quality of plan and performance of current and subsequent queries.

The QER serves as a cache of planning and execution information of previous queries that the optimizer has processed. The QER logs the query execution plan and runtime information of every distinct logical operation that the optimizer has planned for previous queries in the form of QEs. The QEs are connected in the same manner that logical operations in a query execution plan are connected.

Since only distinct QEs are logged, common logical operations of any granularity, such as single-table retrieval and multi-table joins, and including an entire query, are logged only once in the QER. When planning a logical operation for a current and subsequent query, the optimizer can search for and retrieve corresponding QEs from the QER, and then use the query execution plan and runtime information from the previous query in optimizing the current and subsequent query.

As such, the QER provides an efficient infrastructure for a learning optimizer in an environment where many queries are run that may only have a limited set of distinct and interesting common QEs. Furthermore, offline tools can be developed to mine the QER for performance tuning opportunities using algorithmic or machine learning techniques.

Hardware and Software Environment

Figure 1:
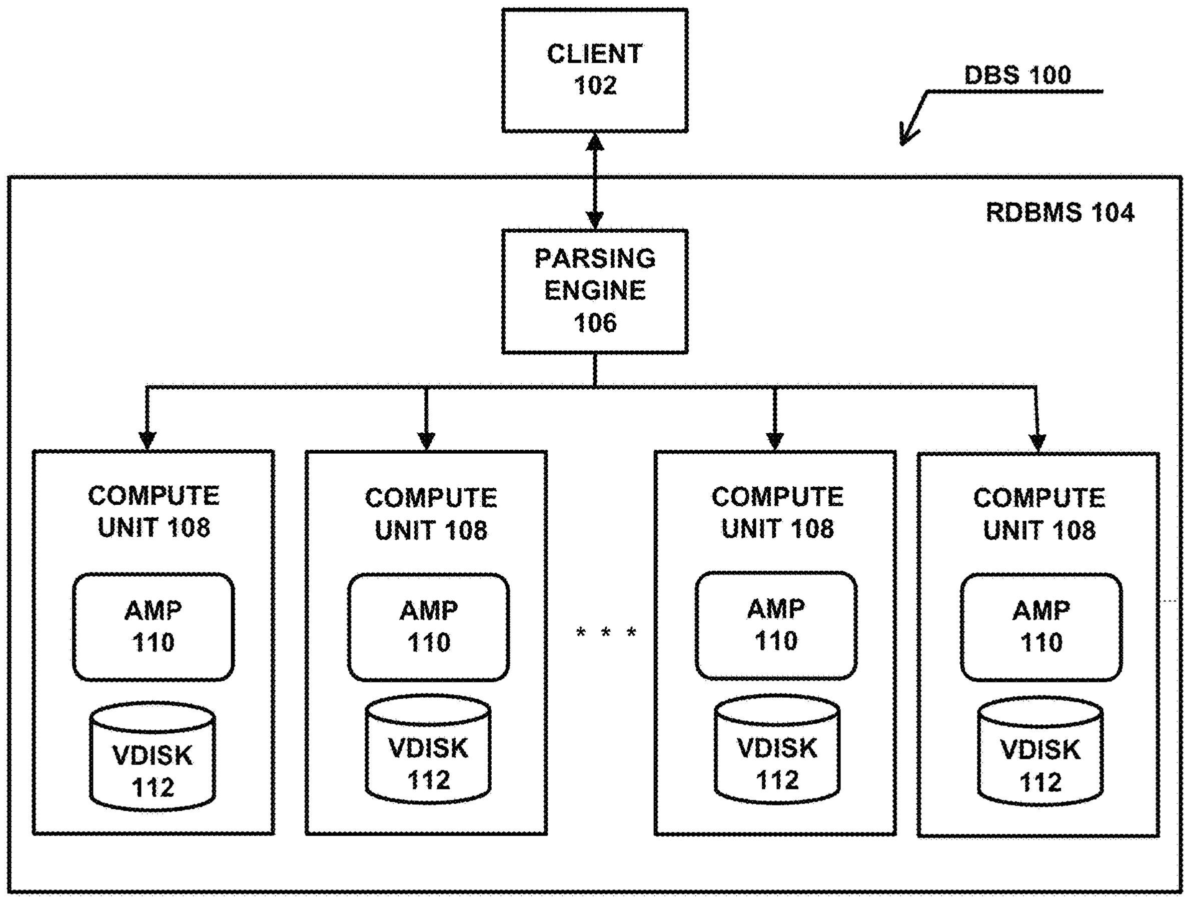
FIG. 1 illustrates an exemplary hardware and software environment according to one embodiment of the present invention.

FIG. 1 illustrates an exemplary hardware and software environment according to one embodiment of the present invention. In the exemplary environment, a database system (DBS) 100 is a computer system that implements a client-server architecture, wherein one or more client computers 102 may include, inter alia, a graphical user interface (GUI), which allows one or more users to interface with one or more server computers, which implement an RDBMS 104 that stores data and metadata in a relational database. The DBS 100 may be implemented in separate machines, or may be implemented as separate or related processes in a single machine.

In one embodiment, the RDBMS 104 includes a parsing engine (PE) 106 that organizes storage of the data and coordinates retrieval of the data from the storage, one or more compute units 108 executing one or more access module processors (AMPs) 110 performing the functions of the RDBMS 104, and one or more virtual disks (VDISKs) 112 storing the relational database of the RDBMS 104. The compute units 108 comprise processors, and the AMPs 110 and VDISKs 112 comprise processes that may be implemented in one or more separate machines or in a single machine.

The RDBMS 104 used in one embodiment comprises the Teradata® RDBMS sold by Teradata US, Inc., the assignee of the present invention, although other DBMS's could be used. In this regard, the Teradata® RDBMS is a hardware and software based data warehousing and analytic application/database system.

Generally, users of the system 100 interact with the client computers 102 to formulate requests for the RDBMS 104, wherein the requests access data stored in the RDBMS 104, and responses are received therefrom. In response to the requests, the RDBMS 104 performs the functions described below, including processing data retrieved from the RDBMS 104. Moreover, the results from these functions may be provided directly to the client computers 102, or may be provided to other systems (not shown), or may be stored by the RDBMS 104 in the relational database.

Note that, in one or more embodiments, the system 100 may use any number of different parallelism mechanisms to take advantage of the parallelism offered by the multiple tier architecture, the client-server structure of the client computers 102, RDBMS 104, PE 106, and the multiple compute units 108, AMPs 110 and VDISKs 112 of the RDBMS 104. Further, data within the relational database may be partitioned across multiple data storage devices to provide additional parallelism.

Generally, the client computers 102, RDBMS 104, PE 106, compute units 108, AMPs 110 and VDISKs 112 comprise hardware, such as computers, processors, data storage devices and networks, and software, such as instructions, logic and/or data tangibly embodied in and/or accessible from a device, media, carrier, or signal, such as RAM, ROM, one or more of the data storage devices, and/or a remote system or device communicating with the computer system 100 via one or more of the networks. The above elements 102-112 and/or operating instructions may also be tangibly embodied in memory and/or data communications devices, thereby making a computer program product or article of manufacture according to the invention. As such, the terms "article of manufacture," "program storage device" and "computer program product" as used herein are intended to encompass a computer program accessible from any computer readable device or media. Accordingly, such articles of manufacture are readable by a computer and embody at least one program of instructions executable by a computer to perform various method steps of the invention.

However, those skilled in the art will recognize that the exemplary environment illustrated in FIG. 1 is not intended to limit the present invention. Indeed, those skilled in the art will recognize that other alternative environments may be used without departing from the scope of the present invention. In addition, it should be understood that the present invention may also apply to components other than those disclosed herein.

Parsing Engine

Figure 2:
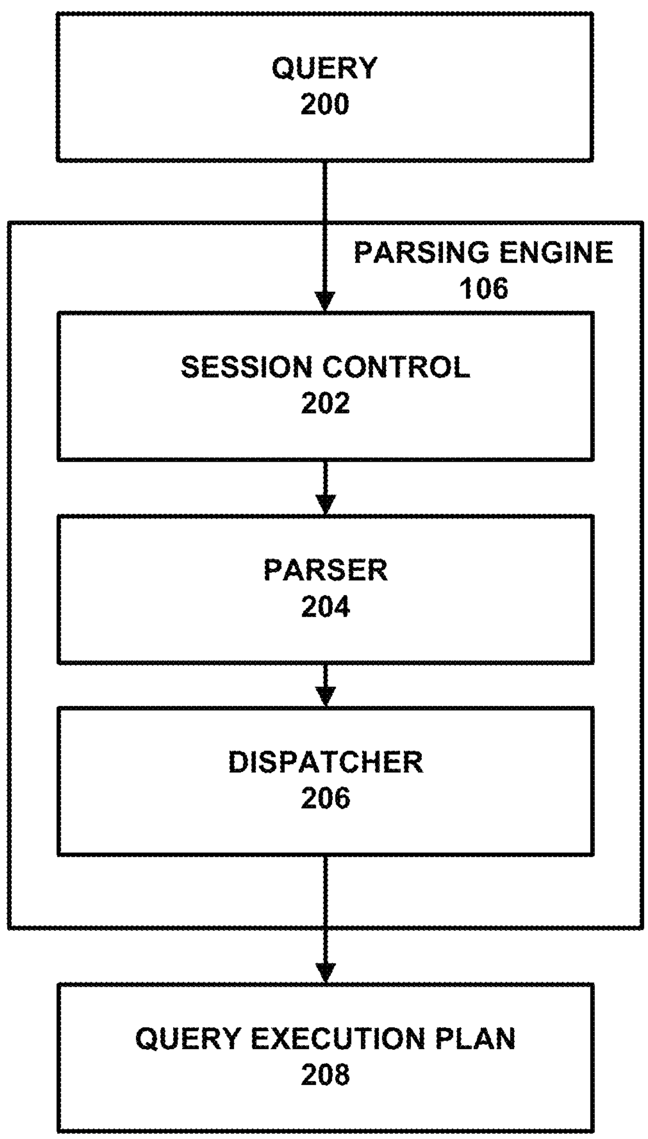
FIG. 2 further illustrates an exemplary set of functions performed by a parsing engine when coordinating the retrieval of data in response to one or more queries.

FIG. 2 further illustrates an exemplary set of functions performed by the PE 106 when coordinating the retrieval of data in response to a query 200. In one example, the PE 106 performs at least three functions: a session control 202, a parser 204, and a dispatcher 206. The session control 202 provides logon and logoff functions, and processes requests for access to the database. Once the session control 202 allows a request for access to the database to begin, the query 200 is routed to the parser 204, which interprets the query 200, and then to the dispatcher 206, which schedules and executes one or more resulting query execution plans 208 generated by the parser 204.

Figure 3:
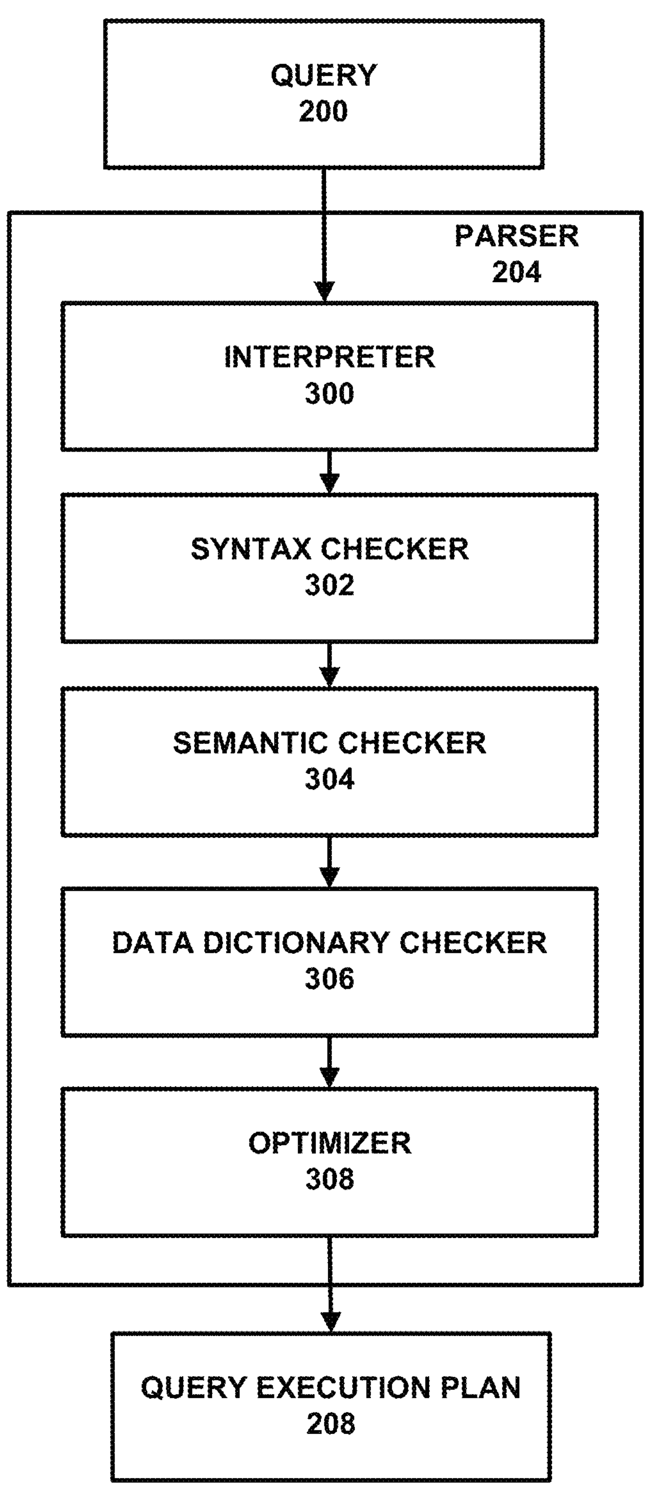
FIG. 3 further illustrates an exemplary set of functions performed by a parser when interpreting a query.

FIG. 3 further illustrates an exemplary set of functions performed by the parser 204 when interpreting the query 200. An interpreter 300 interprets the query 200, a syntax checker 302 checks the query 200 for proper syntax, a semantic checker 304 evaluates the query 200 semantically, and a data dictionary checker 306 consults a data dictionary to ensure that all of the data objects specified in the query 200 actually exist and that the user has the authority to access the data objects. Finally, an optimizer 308 generates one or more query execution plans 208 for the query 200 and selects an optimal query execution plan 208 (e.g., the least expensive plan) to perform the query 200.

Figure 4:
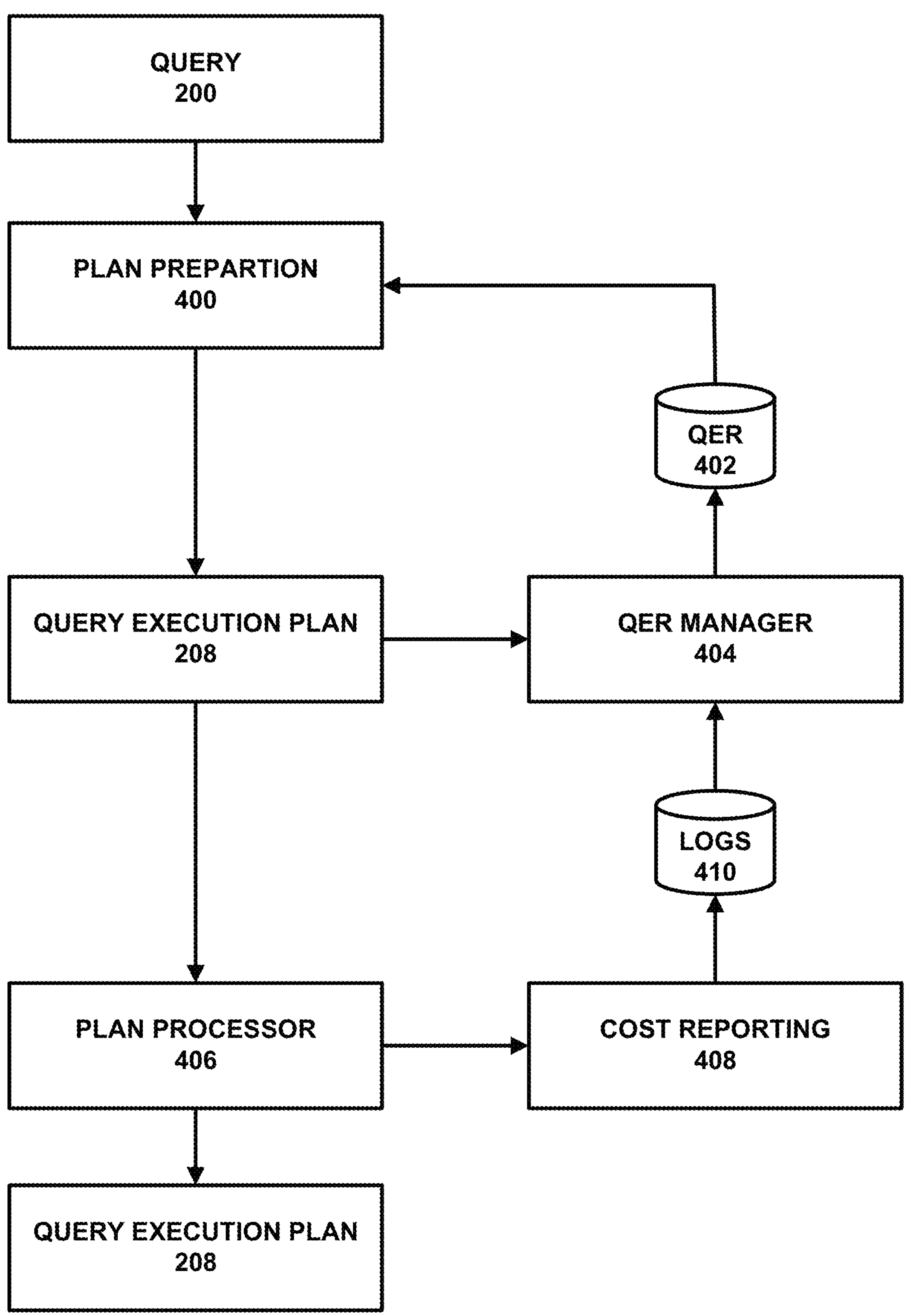
FIG. 4 further illustrates an exemplary set of functions performed by an optimizer when generating query execution plans for a query.

FIG. 4 further illustrates an exemplary set of functions performed by the optimizer 308 when generating and selecting the optimal query execution plan 208 for execution by the RDBMS 104. First, the query 200 is presented for plan preparation 400, wherein the query 200 is analyzed to identify the QEs therein. The plan preparation 400 of the optimizer 308 then accesses a QER 402, which stores planning and execution information for QEs from previous versions of the queries 200, so that the optimizer 308 learns from the previous versions of the queries 200 to improve current and subsequent versions of the queries 20. Specifically, the plan preparation 400 of the optimizer 308 searches the QER 402 for corresponding QEs, and uses information from the QEs stored in the QER 402 when optimizing current and subsequent versions of the queries 200. Moreover, once these query execution plans 208 are generated by the plan preparation 400, they may be used by a QER manager 404 to update the QER 402.

The query execution plans 208 are presented to a plan processor 406, which selects an optimal query execution plan 208 for execution from among the available query execution plans 208, based on predetermined criteria such as estimated cost information. During execution of the optimal query execution plan 208, the plan processor 406 may also collect actual cost information, wherein a cost reporting function 408 stores the actual cost information in one or more logs 410. The QER manager 404 may also store the actual cost information, as well as other information, in the QER 402. Thereafter, the actual cost information is available for use by the plan preparation 400 when computing the estimated cost of performing the query execution plans 208. Thus, the processing of the query 200 and the resulting query execution plans 208 form a feedback loop.

Learning Optimizer

The optimizer 308 uses various cost estimation techniques to generate the optimal query execution plan 208. Cost estimation uses statistics collected on base tables and statistics that the optimizer 308 derives for the results of intermediate and/or final operations, but derived statistics can become inaccurate after several intermediate and final operations are performed.

In one embodiment, the optimizer 308 has the capability to use dynamic statistics collected on the results of one or more query blocks to plan the remaining query blocks of the query execution plan 208. This form of dynamic planning uses intra-query learning at the block level to improve the quality of query execution plans 208 for a complex query 200.

The QER 402 allows the optimizer 308 to access planning and execution information of previous queries 200. Specifically, the QER 302 enables inter-query learning at the QE level, wherein a QE can be a base table select, join, aggregation or other logical operation, as well as a combination of operations. Inter-query learning means that the optimizer 308 reuses results from QEs stored in the QER 402; reuses cost and runtime information of QEs stored in the QER 402; and reuses QEs stored in the QER 402 whose original query execution plans 208 may be too large to be cached.

Offline Learning Tools

The QER 402 also enables offline learning of physical database design choices. For example, QEs stored in the QER 402 can be mined for patterns of operations performed by a workload, e.g., table accesses and join patterns. Knowledge derived from the QER 402 mining can be used to identify indexing and table partitioning schemes as well.

In addition to logs 408 for actual cost information, the DBS 100 may have various query logs 408, for example, including a query log that logs query-level information along with the text of a query 200, an XML, plan log that logs query execution plans 208 in XML form, a StepInfo log that logs planning and runtime information of steps from the query execution plans 208; and an object usage log that logs the frequency of usage of data objects in the relational database. These logs 408 include query IDs that can be used to join the various information to obtain various levels of query-by-query details.

Unlike the QER 402, the existing query logs 408 do not have the capability to log distinct QEs and it is not trivial to identify duplicate QEs based on the text of the query 200. Since existing query 200 logging is done at the query 200 level, it is also not trivial to discover common operations across multiple queries 200. As such, learning of physical database design choices from existing logs 408 would require non-trivial processing of a large volume of complex data, in contrast to learning from the QER 402 based on distinct (and succinct) QEs.

Query Expressions

The QEs are stored in the QER 402 with a QE identifier (QE ID); an operation performed (QE OP); one or more source identifiers associated with the operation; and operation-specific information such as frequency of use, projections and conditions. Other information, such as actual and estimated cost information may be included as well.

The QEs are stored in the QER 402 in the order that the optimizer 308 plans the operations for a query 200. A QE that is a source for an intermediate and/or final operation is logged first, and its QE ID is then saved as the source in the QE that is logged later for the intermediate and/or final operation.

The sources for the operation of each QE allow the QEs to be represented by the optimizer 308 as QE trees. The QEs are stored in the QER 402 in a bottom-up order of the QE trees. Any node in the QE tree corresponds to a QE expression that is comprised of all the operations represented by the QE tree that is rooted at that QE node.

For example, consider following query, Q1, on "STORE_SALES" and "DATE_DIM" tables of a database:

```
Q1:
SELECT    SS_CUSTOMER_KEY, SS_LIST_PRICE,
          SS_DISCOUNT_AMT, D_YEAR
FROM      STORE_SALES, DATE_DIM
WHERE     SS_SOLD_DATE_SK = D_DATE_SK
          AND D_YEAR >= 2001 AND D_YEAR <= 2002;
```

Figure 6:
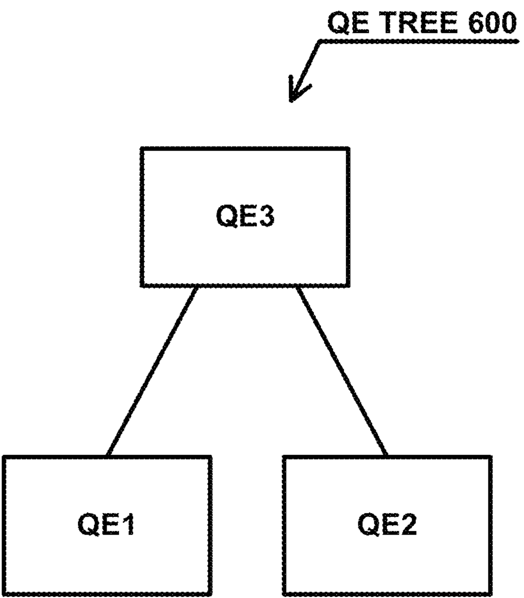
FIG. 6 is a diagram of a query expression tree resulting from the query expressions of FIG. 5 logged in the query expression repository.

The resulting QEs, labeled as QE1, QE2 and QE3, are logged in the QER 402 as shown in FIG. 5. In addition, QE1, QE2 and QE3 form a QE tree 600 as shown in FIG. 6.

QE1 logs a query expression that selects from the STORE_SALES table: "SELECT SS_LIST_PRICE, SS_DISCOUNT_AMT, SS_SOLD_DATE_SK FROM STORE_SALES;".

QE2 logs a query expression that selects from the DATE_DIM table: "SELECT D_DATE_SK, D_YEAR_FROM_DATE_DIM WHERE D_YEAR>=2001 AND D_YEAR<=2002;".

Although QE3 logs only the join operation, QE3 represents an entire query expression that selects and joins the STORE_SALES and DATE_DIM tables. In this case, QE3 also represents an entire query Q1.

Query Expression Repository

The QER 402 is managed by the QER manager 404, which uniquely identifies each of the QEs in the QER 402 and increments a frequency for each of the QEs based on how often each of the QEs is referenced in the previous, current and subsequent versions of the queries 200.

When a QE is logged into the QER 402, the QER manager 404 first checks whether the QE matches an existing QE in the QER 402. If a match is not found, a new QE entry with a frequency of one is added to the QER 402, and the new QE entry is assigned a QE ID that uniquely identifies the QE within the QER 402. If a match is found, the QER manager 404 simply increments frequency of the found entry by one.

Thereafter, QE matching is a light-weight process where the optimizer 308 searches the QER 402 for the QEs based on the operation, source identifiers, projections and conditions. Logging and matching of QEs is performed in a bottom-up order of the QE tree 600, i.e., a source QE is matched and/or logged first, and then a QE of the operation that it is the source QE is matched and/or logged. Therefore, matching of any QE node in the QE tree 600 results in a matching of the entire QE tree 600 that is rooted at that node.

For example, consider the following query, Q2, that has the same "STORE_SALES" and "DATE_DIM" join as Q1 with an additional join with a "CUSTOMER" table:

```
Q2:
SELECT   C_CUSTOMER_ID, C_FIRST_NAME, C_LAST_NAME,
         C_BIRTH_COUNTRY, C_EMAIL_ADDRESS,
         SS_LIST_PRICE, SS_DISCOUNT_AMT, D_YEAR
FROM     STORE_SALES, DATE_DIM, CUSTOMER
WHERE    SS_SOLD_DATE_SK = D_DATE_SK
         AND C_CUSTOMER_SK = SS_CUSTOMER_SK
         AND D_YEAR >= 2001 AND D_YEAR <= 2002;
```

The common query expression that joins "STORE _SALES" and "DATE_DIM" is discovered through matching of QE1, QE2 and then QE3.

Figure 8:
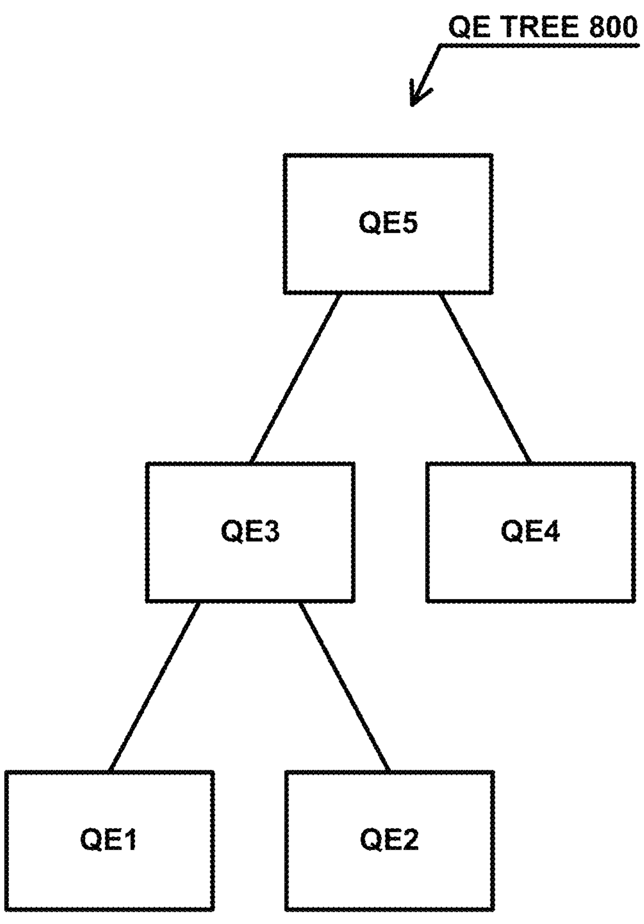
FIG. 8 is a diagram of a query expression tree resulting from the additional query expressions of FIG. 7 logged in the query expression repository.

FIG. 7 shows the QEs in the QER 402 after Q2 has been logged. In addition, QE4 and QE5 are now part of a QE tree 800 formed by QE1, QE2 and QE3 in the QER 402 as shown in FIG. 8.

Plan preparation 400 of current and subsequent queries 200 can learn from the information recorded in the QER 402 for any granularity of QEs that matches a QE at any level within the QE tree 800.

CONCLUSION

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented apparatus, comprising:

(a) a relational database management system (RDBMS) executing in a computer system, wherein the RDBMS manages a relational database comprised of one or more tables storing data; and (b) the RDBMS interpreting a current query comprised of a plurality of query expressions to generate one or more query execution plans for execution by the RDBMS, wherein each of the query expressions comprises a logical operations and one or more source identifiers, projections, and conditions associated with the logical operation;

(c) an optimizer of the RDBMS enables inter-query learning at a query expression level by:

the RDBMS storing each of the query expressions and their associated query execution plans from previous queries as uniquely identified in a query expression repository (QER), wherein the query expressions are represented as query expression trees stored in a bottom-up order, and any node in the query expression trees is comprised of the logical operations rooted at the node;

the RDBMS searching the QER for each of the query expressions found in the current query, wherein the searching is based on the logical operation, the source identifiers, projections, and conditions of the query expressions from the previous queries stored in the QER, and the RDBMS using the query execution plans stored with the query expressions and their associated query expression trees found in the QER to generate the query execution plans for each of the query expressions found in the current query, so that the optimizer of the RDBMS learns from the previous queries to improve the current query.

2. The apparatus of claim 1, wherein the optimizer reuses results from the query expressions stored in the query expression repository.

3. The apparatus of claim 2, wherein the results comprise table relations, intermediate results or final results of the query expressions.

4. The apparatus of claim 1, wherein each of the query expressions are stored in the query expression repository with a query expression identifier; the logical operation performed; one or more of the source identifiers associated with the logical operation; and operation-specific information including frequency of use, the projections and the conditions.

5. The apparatus of claim 1, wherein the query expressions are stored in the query expression repository in an order that the optimizer plans the query expressions.

6. The apparatus of claim 1, wherein the query expression repository is managed by a query expression repository manager that uniquely identifies each of the query expressions in the query expression repository and increments a frequency for each of the query expressions based on how often each of the query expressions is referenced in the previous, current and subsequent versions of the queries.

7. A computer-implemented method, comprising:

(a) executing a relational database management system (RDBMS) in a computer system, wherein the RDBMS manages a relational database comprised of one or more tables storing data;

(b) the RDBMS interpreting a current query comprised of a plurality of query expressions to generate one or more query execution plans for execution by the RDBMS, wherein each of the query expressions comprises a logical operation and one or more source identifiers, projections, and conditions associated with the logical operation;

(c) an optimizer of the RDBMS enables inter-query learning at a query expression level by:

the RDBMS storing each of the query expressions and their associated query execution plans from previous queries as uniquely identified in a query expression repository (QER), wherein the query expressions are represented as query expression trees stored in a bottom-up order, and any node in the query expression trees is comprised of the logical operations rooted at the node;

the RDBMS searching the QER for each of the query expressions found in the current query, wherein the searching is based on the logical operation, the source identifiers, projections, and conditions of the query expressions from the previous queries stored in the QER, and the RDBMS using the query execution plans stored with the query expressions and their associated query expression trees found in the QER to generate the query execution plans for each of the query expressions found in the current query, so that the optimizer of the RDBMS learns from the previous queries to improve the current query.

8. The method of claim 7, wherein the optimizer reuses results from the query expressions stored in the query expression repository.

9. The method of claim 8, wherein the results comprise table relations, intermediate results or final results of the query expressions.

10. The method of claim 7, wherein each of the query expressions are stored in the query expression repository with a query expression identifier; the logical operation performed; one or more of the source identifiers associated with the logical operation; and operation-specific information including frequency of use, the projections and the conditions.

11. The method of claim 7, wherein the query expressions are stored in the query expression repository in an order that the optimizer plans the query expressions.

12. The method of claim 7, wherein the query expression repository is managed by a query expression repository manager that uniquely identifies each of the query expressions in the query expression repository and increments a frequency for each of the query expressions based on how often each of the query expressions is referenced in the previous, current and subsequent versions of the queries.

13. A computer program product, the computer program product comprising a non-transitory computer readable storage medium having program instructions embodied therewith, the program instructions executable by a computer system to cause the computer system to perform a method, comprising:

(a) executing a relational database management system (RDBMS) in a computer system, wherein the RDBMS manages a relational database comprised of one or more tables storing data;

(b) the RDBMS interpreting a current query comprised of a plurality of query expressions to generate one or more query execution plans for execution by the RDBMS, wherein each of the query expressions comprise a logical operation and one or more source identifiers, projections, and conditions associated with the logical operation;

(c) an optimizer of the RDBMS enables inter-query learning at a query expression level by:

the RDBMS storing each of the query expressions and their associated query execution from previous queries as uniquely identified in a query expression repository (QER), wherein the query expressions are represented as query expression trees stored in a bottom-up order, and any node in the query expression trees is comprised of the logical operations rooted at the node;

the RDBMS searching the QER for each of the query expressions found in the current query, wherein the searching is based on the logical operation, the source identifiers, projections, and conditions of the query expressions from the previous queries stored in the QER, and the RDBMS using the query execution plans stored with the query expressions and their associated query expression trees found in the QER to generate the query execution plans for each of the query expressions found in the current query, so that the optimizer of the RDBMS learns from the previous queries to improve the current query.

14. The computer program product of claim 13, wherein the optimizer reuses results from the query expressions stored in the query expression repository and the results comprise table relations, intermediate results or final results of the query expressions.

15. The computer program product of claim 13, wherein each of the query expressions are stored in the query expression repository with a query expression identifier; the logical operation performed; one or more of the source identifiers associated with the logical operation; and operation-specific information including frequency of use, the projections and the conditions.

16. The computer program product of claim 13, wherein the query expressions are stored in the query expression repository in an order that the optimizer plans the query expressions.

17. The computer program product of claim 13, wherein the query expression repository is managed by a query expression repository manager that uniquely identifies each of the query expressions in the query expression repository and increments a frequency for each of the query expressions based on how often each of the query expressions is referenced in the previous, current and subsequent versions of the queries.

* * * * *